Patented July 2, 1929.

1,719,131

UNITED STATES PATENT OFFICE.

RAYMOND R. RIDGWAY AND JOHN B. GLAZE, OF LA SALLE, NEW YORK, ASSIGNORS TO NORTON COMPANY, A CORPORATION OF MASSACHUSETTS.

ALUMINOUS MATERIALS AND PROCESS OF PREPARING THE SAME.

No Drawing. Application filed October 15, 1926. Serial No. 141,874.

This invention relates to the art of treating aluminous materials, and to the manufacture therefrom of products of industrial value.

A primary object of the invention is to provide a novel and practicable process whereby aluminous materials, (which may be either pure or impure and either crystalline or amorphous) may be converted into a form of aluminum oxid of better availability for a wide range of commercial applications, including for example the manufacture of abrasive grains and abrasive implements, the manufacture of refractory articles, the production of aluminum metal by electrolytic or electrothermic methods, and others. The aluminum oxid thus prepared will vary in composition, purity and physical characteristics according to the operating conditions, a very high degree of purity being attainable when desired.

In the practice of our invention in its preferred embodiment we employ a flux, used in relatively small proportions (not substantially exceeding 3 percent by weight of the aluminous product) and of such nature that when used within these proportions it does not contaminate the alumina with any foreign product such as the sulfides of iron and titanium, requiring an expensive acid treatment for its removal. The flux which we use is aluminum sulfid, $Al_2S_3$, or other aluminum-sulfur combination, which may be introduced as such into the charge; or, and preferably, which is produced in the charge during the furnacing operation. Although our invention is not limited thereto, we prefer to produce the aluminum sulfid in the furnace from a charge comprising alumina, for example in the form of calcined bauxite, carbon, and a sulfid of iron. Presumably the formation of aluminum sulfid takes place according to the equation:

$$Al_2O_3 + 3FeS + 3C = Al_2S_3 + 3CO + 3Fe$$

The charge preferably includes iron borings or other suitable source of metallic iron; and the sulfid component may be introduced in the form of iron pyrites, $FeS_2$. It is convenient to assume that after furnacing the sulfur is combined with aluminum as the known aluminum sulfid $Al_2S_3$, although this has not been definitely determined to be the fact.

Our invention includes, as a new composition of matter, the novel aluminous product in the form of a pig, ingot, slab, sheet or the like, characterized by the presence therein of an aluminum sulfid flux in properly limited proportion, and by the capability of undergoing relatively rapid disintegration when subjected to hydrating conditions, as for example under the action of saturated steam. In addition to the crystalline alumina which is the principal component, a solid product of the hydrating operation is aluminum hydroxid, derived by hydrolysis from the sulfid; and in its preferred embodiment as applied to the manufacture of abrasives and refractories the process is so operated that this hydroxid may be recovered in the form of crystalline alumina of high purity by a re-furnacing operation.

Following is an illustrative, typical and preferred embodiment of the invention, which however is not restricted to the particular materials, proportions and operating conditions described:

A typical charge consists by weight of:

| | Parts. |
|---|---|
| Calcined bauxite | 100 |
| Coke | 5–10 |
| Pyrite ($FeS_2$) | 5 |
| Iron borings | 20 |

This mixture is fed to a carbon-lined tapping furnace of the submerged arc type, the furnace being charged with a deep cover in order to conserve heat and to prevent excessive loss of pyritic sulfur. The furnace is tapped at suitable intervals, say every four hours, into a ladle, in which a separation of the metal from the melted aluminous material takes place, this metal comprising the iron derived from the alumina-iron sulfid reaction and from the borings introduced into the charge, as well as the iron, silicon and titanium reduced from the bauxite. In addition to the reduced alloy there is formed in the charge a certain amount of aluminum carbide $Al_4C_3$, an intermediate reduction product or products which is conveniently assumed to be aluminum suboxid, AlO, and some metallic aluminum and ferro-aluminum of high aluminum content. In case a product very low in titanium oxid is desired it is essential so to conduct the furnacing operation, with respect to the proportion of coke or other reducing agent, and the temperature, that the product will contain some aluminum carbide, the presence of which is readily demonstrated by an evolution of methane, $CH_4$, under the action of acids.

For the preparation of aluminous products of high purity it is essential that the non-aluminous impurities, including the titanium oxid, be completely reduced; and this requires the powerful reducing action of aluminum carbide and the accompanying products (suboxide, ferro-aluminum, etc.) collectively referred to herein as reduction products of alumina. It is further essential for the preparation of such high purity alumina that the normal ingot or solidified melt should be so far subdivided (disintegrated) that the resulting fragments or grains shall be practically free from inclusions of any kind.

We so conduct the operation that the non-metallic portion of the electric furnace melt, after solidification, consists of grains of crystalline alumina so small as to be substantially free from slag or other inclusions, but separated from each other by inter-granular layers of the above-mentioned reduction products, upon the presence of which, at this stage, the purity of the alumina as ultimately recovered depends. Associated with this inter-granular material, according to the present invention, is a small proportion of aluminum sulfide.

The proportion of aluminum sulfide requires to be carefully controlled in order to accomplish the desired results. If the proportion is too small the desired disintegrating action will not be secured. If too large, the formation of aluminum carbide will be prevented and the alumina crystals will be contaminated by sulfides, particularly sulfides of iron and titanium. Moreover the reduction of titanium oxide will be incomplete. For optimum results we prefer to employ a proportion of aluminum sulfide to the total charge between 1 and 2% by weight, and in no case substantially in excess of 3%. Typical analyses of the aluminous product of this furnacing operation are as follows:

| | | | | | |
|---|---|---|---|---|---|
| $SiO_2$ | .05 | .04 | .02 | .42 | --- |
| $Fe_2O_3$ | .25 | .34 | .34 | .23 | .26 |
| $TiO_2$ | .28 | .44 | .36 | .26 | .26 |
| $Al_2S_3$ | 1.00 | 1.00 | .90 | 1.50 | 1.80 | the balance substantially all alumina $Al_2O_3$, and aluminum carbide as indicated above.

The aluminum sulfid component which constitutes the flux above mentioned, and which in our preferred procedure is present in the proportion of about 1–2 percent of the mass, more or less, profoundly influences the operation and the product. The melting point is sufficiently lowered so that the product is readily tapped, even from comparatively small furnaces. Its fluidity is such that the iron-silicon-titanium alloy settles quickly and almost completely in the ladle, whereas without the sulfid flux the product flows sluggishly, and tends to chill quickly in layers between which the metal is distributed. A most important characteristic of the product is its quality of disintegrating into fine irregular crystalline grains interspersed with hydrated alumina, when subjected to hydrolyzing conditions.

The aluminum sulfid component may be decomposed in various ways, as for example by treating the solidified product with acid, with alkali, with chlorin, with hot or cold water, with superheated steam, or with saturated steam. As between these various reagents, saturated steam has been found most effective and economical, this being probably attributable to the fact that saturated steam yields a gelatinous aluminum hydrate which physically aids the disintegration; whereas acid, alkali and chlorin yield liquid or gaseous products of decomposition which are not effective for this purpose, and superheated steam yields a partially dehydrated alumina which is relatively ineffective.

The aluminous product is allowed to solidify, for instance by casting into slabs or sheets, broken into lumps by a sledge, and the lumps charged into a hydrator where they are subjected to the action of saturated steam, and become reduced to fine powder in the course of a few hours. The hydrated material is dried in any convenient way, for example in a rotary dryer; and is then screened for the removal of metallic globules and undecomposed lumps, the latter being returned to the process, either in the furnace or in the hydrator. A typical hydrated product contains alumina crystals varying from 0.20 mm. to less than 0.01 mm. in diameter, with an average crystal diameter of about 0.11 mm. It will be understood that these sizes may vary, depending upon operating conditions, and particularly upon the rate of cooling from the molten state.

The fine material after drying, screening and magnetic separation is ready for the subsequent treatment to remove non-magnetic metals not separated by the preceding operations; carbide and suboxid of aluminum or aluminum metal; and any iron or titanium slag which may be present. This is best accomplished by chlorination at a temperature above 500° C., the fine powder being continuously treated with dry chlorin in a rotary retort. The products of this treatment are pure $Al_2O_3$, largely crystalline but partly amorphous derived from the hydroxid; and the volatile chlorides of non-aluminous metals, as well as volatile chlorides derived from aluminum carbide, suboxid, metal, or sulfid. A typical analysis of the product after chlorination is

| | Per cent. |
|---|---|
| $SiO_2$ | .03 |
| $Fe_2O_3$ | .08 |
| $TiO_2$ | .16 | the balance substantially all alumina.

Any calcium which may remain may be removed without loss of alumina by treatment with dilute acids, in which the alumina has been rendered insoluble by the calcination incident to the chlorination. If however the calcium is within specification limits such treatment is of course unnecessary. Calcium is largely eliminated as a soluble sulfur compound in the drainings from the hydrator, or by a subsequent washing operation.

The pure alumina component of the powder at this stage consists of 90–95 percent of irregular crystals of varying sizes and shapes, with 5–10 percent of amorphous alumina derived from the hydroxide. The product may be re-fused in an electric furnace under conditions as are customary in the manufacture of aluminous abrasives and refractories, and converted into grain in the usual way. A typical analysis of the re-fused product is:

| | |
|---|---|
| $SiO_2$ | Traces |
| $Fe_2O_3$ | 0.21 |
| $TiO_2$ | 0.18 |
| Carbon | 0.07 | the balance substantially all crystalline alumina.

Or as stated above the fine purified product is directly available for use in the electrolytic preparation of metallic aluminum.

As already stated, we prefer to prepare an initial melt containing about 1 to 2 percent of aluminum sulfid. If the proportion of sulfid be substantially increased, say above about 5%, the temperature of the melt is reduced, with the result that a thorough reduction, especially of titanium oxid, is not easily secured; and some ferrous sulfid tends to remain in the product, necessitating an acid treatment for its removal, and greatly increasing the operating expense. With still higher percentages of sulfid, up to say 40% of the melt, an entirely distinct type of effect is secured, the alumina dissolving in the sulfid melt and separating out therefrom on cooling as perfectly formed crystals the size of which may be controlled by varying the rate of cooling, and which may be separated from the sulfid matrix by an acid treatment or otherwise. Accordingly the present invention is concerned only with melts of low sulfur content, as defined herein.

This application is a continuation in part of our prior application, Serial No. 73,886, filed December 7, 1925.

We claim:

1. As a new article of manufacture a solidified aluminous product comprising crystalline alumina grains of high purity, in association with reduction products of alumina and with aluminum sulfide, the proportion of sulfide not substantially exceeding 3% by weight of the mass; said product undergoing disintegration when subjected to hydrating conditions.

2. Process of making an aluminous product comprising preparing a disintegrating mass by electrically fusing a charge including impure alumina, carbon, iron and sulfur proportioned to yield a disintegrating product containing reduction products of alumina together with aluminum sulfide, the latter not substantially in excess of 3% by weight; disintegrating said product by hydration; and purifying the disintegrated material.

In testimony whereof, we affix our signatures.

RAYMOND R. RIDGWAY.
JOHN B. GLAZE.